(12) United States Patent
Shan et al.

(10) Patent No.: US 12,529,913 B2
(45) Date of Patent: Jan. 20, 2026

(54) METHOD FOR REDUCING NEAR-INFRARED LIGHT EXPOSURE BY A LAMINATE FILM STRUCTURE ON AN EYEWEAR

(71) Applicant: Essilor International, Charenton-le-pont (FR)

(72) Inventors: Haifeng Shan, Shrewsbury, MA (US); Hao-Wen Chiu, Holden, MA (US)

(73) Assignee: Essilor International, Charenton-le-Pont (FR)

( * ) Notice: Subject to any disclaimer, the term of this patent is extended or adjusted under 35 U.S.C. 154(b) by 376 days.

(21) Appl. No.: 18/028,334

(22) PCT Filed: Sep. 27, 2021

(86) PCT No.: PCT/EP2021/076539
§ 371 (c)(1),
(2) Date: Mar. 24, 2023

(87) PCT Pub. No.: WO2022/064050
PCT Pub. Date: Mar. 31, 2022

(65) Prior Publication Data
US 2023/0375860 A1    Nov. 23, 2023

(30) Foreign Application Priority Data
Sep. 28, 2020  (EP) .................................. 20306107

(51) Int. Cl.
*G02C 7/10*           (2006.01)
(52) U.S. Cl.
CPC ......... *G02C 7/104* (2013.01); *G02C 2202/16* (2013.01)

(58) Field of Classification Search
CPC .... G02C 7/104; G02C 2202/16; G02B 5/208; G02B 5/22; G02B 5/26; G02B 27/0172
(Continued)

(56) References Cited

U.S. PATENT DOCUMENTS

| | | | |
|---|---|---|---|
| 6,793,339 B1 | 9/2004 | Yip et al. | |
| 10,444,546 B2 * | 10/2019 | Wold | ..................... G02C 7/107 |

(Continued)

FOREIGN PATENT DOCUMENTS

| | | |
|---|---|---|
| CN | 105372847 | 2/2019 |
| EP | 1174734 | 11/2004 |

(Continued)

OTHER PUBLICATIONS

International Search Report and Written Opinion issued in corresponding PCT Application No. PCT/EP2021/076539, mailed Nov. 2, 2021.

(Continued)

*Primary Examiner* — William R Alexander
(74) *Attorney, Agent, or Firm* — Norton Rose Fulbright US LLP

(57) ABSTRACT

The present disclosure relates to a laminate film structure for a wearer, intended for reflecting and absorbing near-infrared light, comprising a near-infrared reflection layer reflecting the near-infrared light that is incident on the near-infrared reflection layer, and a near-infrared absorption layer disposed between an eye of the wearer and the near-infrared reflection layer, the near-infrared reflection layer being disposed on the near-infrared absorption layer and the near-infrared absorption layer absorbing the near-infrared light.

15 Claims, 15 Drawing Sheets

(58) Field of Classification Search
USPC .................................................. 351/159.62
See application file for complete search history.

(56) References Cited

U.S. PATENT DOCUMENTS

| | | | | |
|---|---|---|---|---|
| 10,962,806 | B2* | 3/2021 | Weber | G02B 5/283 |
| 10,983,367 | B2* | 4/2021 | Clerc | G02B 5/285 |
| 11,065,855 | B2* | 7/2021 | Klun | G02B 5/26 |
| 2008/0291541 | A1* | 11/2008 | Padiyath | G02B 5/0205 |
| | | | | 359/569 |
| 2012/0075577 | A1* | 3/2012 | Ishak | G02C 7/108 |
| | | | | 351/159.6 |
| 2015/0146166 | A1* | 5/2015 | Weber | G02B 5/283 |
| | | | | 359/359 |
| 2016/0252664 | A1 | 9/2016 | Kim et al. | |
| 2017/0307792 | A1* | 10/2017 | Yonezawa | B32B 27/36 |
| 2018/0095203 | A1 | 4/2018 | Ooi et al. | |
| 2018/0113326 | A1 | 4/2018 | Gloege et al. | |
| 2018/0113328 | A1* | 4/2018 | Weber | G02B 5/282 |
| 2018/0239171 | A1* | 8/2018 | Wold | G02B 5/28 |
| 2019/0179169 | A1* | 6/2019 | Clerc | G02B 5/285 |
| 2019/0310404 | A1* | 10/2019 | Klun | G02B 5/208 |

FOREIGN PATENT DOCUMENTS

| | | |
|---|---|---|
| EP | 1887414 | 12/2013 |
| EP | 3318920 | 7/2022 |
| JP | 2005/215038 | 8/2005 |
| WO | WO 2017/141252 | 8/2017 |
| WO | WO 2017/199249 | 11/2017 |

OTHER PUBLICATIONS

Extended European Office Communication issued in corresponding European Application No. 20306107.2, dated Aug. 29, 2024.

* cited by examiner

METHOD FOR REDUCING NEAR-INFRARED LIGHT EXPOSURE BY A LAMINATE FILM STRUCTURE ON AN EYEWEAR

CROSS-REFERENCE TO RELATED APPLICATIONS

This application is a national phase application under 35 U.S.C. § 371 of International Application No. PCT/EP2021/076539 filed 27 Sep. 2021, which claims priority to European Patent Application No. 20306107.2 filed 28 Sep. 2020. The entire contents of each of the above-referenced disclosures is specifically incorporated by reference herein without disclaimer.

BACKGROUND

Field of the Disclosure

The present disclosure relates to a method for reducing near-infrared light exposure to an eye by a laminate film structure on an eyewear.

Description of the Related Art

Many studies have been done to evaluate the effects of near-infrared light (NIR) on human eyes. Some studies show that NIR light can transmit through ocular media (e.g., cornea, lens, aqueous, and iris, etc.) to the retina where NIR light is absorbed by retinal pigment epithelium. If the retina is exposed to high intensity of NIR light, structural retinal damage happens by at least one of three fundamental processes: photomechanical (or photoacoustic) process, photothermal (heating effects) process, and photochemical process depending on the influence rate, total dose, and spectral characteristics of the NIR light. Acute NIR light exposure is well known to lead to cataracts and recent investigations show a strong presumption that cataracts can also be triggered by chronic NIR exposure.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present disclosure.

Aspects of the invention may address some of the above-described shortcomings in the art, particularly using solutions set forth in the claims.

SUMMARY

The present disclosure relates to reducing near-infrared (NIR) light exposure to an eye by the inclusion of a laminate film structure on eyewear.

The present disclosure relates to a laminate film structure for a wearer intended for reflecting and absorbing near-infrared (NIR) light such as defined in the set of claims comprising:
  a near-infrared reflection layer reflecting the near-infrared light that is incident on the near-infrared reflection layer, and
  a near-infrared absorption layer disposed between an eye of the wearer and the near-infrared reflection layer, the near-infrared reflection layer being disposed on the near-infrared absorption layer and the near-infrared absorption layer absorbing the near-infrared light, wherein the near-infrared absorption layer may be a thermoplastic film including thermoplastic resin and one or more near-infrared light filters, each of the one or more near-infrared light filters may have a different concentration and a different absorption range between 780 nm and 2000 nm, a first near-infrared light absorption layer of the one or more near-infrared light filters may have at least one near-infrared light absorption peak within at least one of the following ranges: 780-880 nm, 960-1080 nm, 1180-1320 nm, 1480-1760 nm and a percentage of reflection of the near-infrared light from the first near-infrared light absorption layer may be less than 9%, the near-infrared reflection layer may include: a thermoplastic film with a silver nanoparticle coating, or a multilayer infrared reflecting film, or a thermoplastic film with a nano-ceramic coating, or a thermoplastic film with an anti-reflection coating, or a thermoplastic film with a mirror coating, near-infrared light transmission of the near-infrared reflection layer may be less than 30% and near-infrared light reflection of the near-infrared reflection layer may be larger than 31%, a near-infrared light reflection peak of the near-infrared reflection layer may be between 780 nm and 2000 nm, at least one near-infrared light absorption peak of the near-infrared absorption layer substantially matches at least one near-infrared light reflection peak of the near-infrared reflection layer, the near-infrared reflection layer may be an outer layer of the laminate film structure, an ophthalmic lens may be disposed between the near-infrared absorption layer and the eye of the wearer, the near-infrared absorption layer may be integrated with the ophthalmic lens, the near-infrared absorption layer may absorb a transmitted near-infrared light, the transmitted near-infrared light first passing through the near-infrared reflection layer, and the near-infrared absorption layer absorbs a reflected near-infrared light, the reflected near-infrared light first passing through the near-infrared absorption layer and then reflecting from the backside of the near-infrared reflection layer.

The present disclosure further relates to a method of reducing near-infrared light exposure to an eye by a laminate film structure on an eyewear such as defined in the set of claims, comprising absorbing near-infrared light by a first layer of the laminate film structure, the first layer located between the eye and a second layer, and reflecting the near-infrared light by the second layer of the laminate film structure, the second layer located on the first layer.

The present disclosure further relates to an eyewear structure such as defined in the set of claims for protecting an eye from near-infrared light, comprising a near-infrared absorption layer disposed on the ophthalmic lens, the near-infrared absorption layer absorbing the near-infrared light, and a near-infrared reflection layer disposed on the near-infrared absorption layer, the near-infrared reflection layer reflecting the near-infrared light, wherein the ophthalmic lens may be disposed between the eye and the near-infrared absorption layer, and wherein the near-infrared absorption layer may be disposed between the ophthalmic lens and the near-infrared reflection layer, a total near-infrared light transmission through the eyewear structure may be less than a total visible light transmission through the eyewear structure.

The foregoing paragraphs have been provided by way of general introduction, and are not intended to limit the scope of the following claims. The described features, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

Unless indicated otherwise, the features and embodiments described herein are operable together in any permutation.

The terms "about" and "approximately" are defined as being close to as understood by one of ordinary skill in the art.

The process of the present disclosure can "comprise," "consist essentially of," or "consist of" particular ingredients, components, compositions, etc., disclosed throughout the specification.

The present disclosure describes a laminate film structure for a wearer intended for reflecting and absorbing near-infrared light. For example, this laminate film combining a NIR reflecting film with a NIR absorbing layer in a specific order may be created to protect wearer's eyes from exposure of NIR light.

The present disclosure describes a method of reducing near-infrared light exposure to an eye by a laminate film structure on eyewear. For example, this method may be used to provide sunwear having lenses with NIR blocking which may be one of the most efficient ways to achieve protection from NIR light.

Figure 1A:
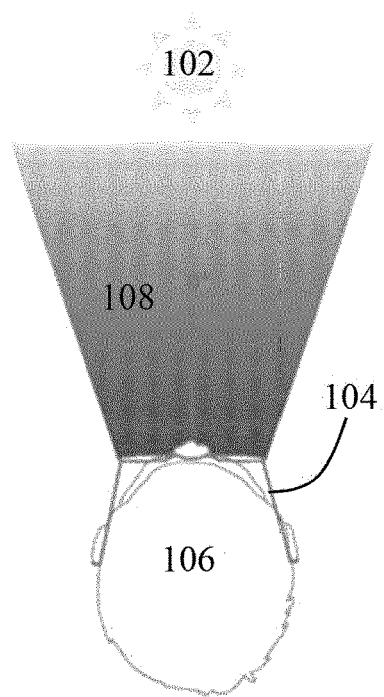
FIG. 1A is a schematic illustration of light paths to glasses of wearer from a front side, within the scope of the present disclosure.
Figure 1B:
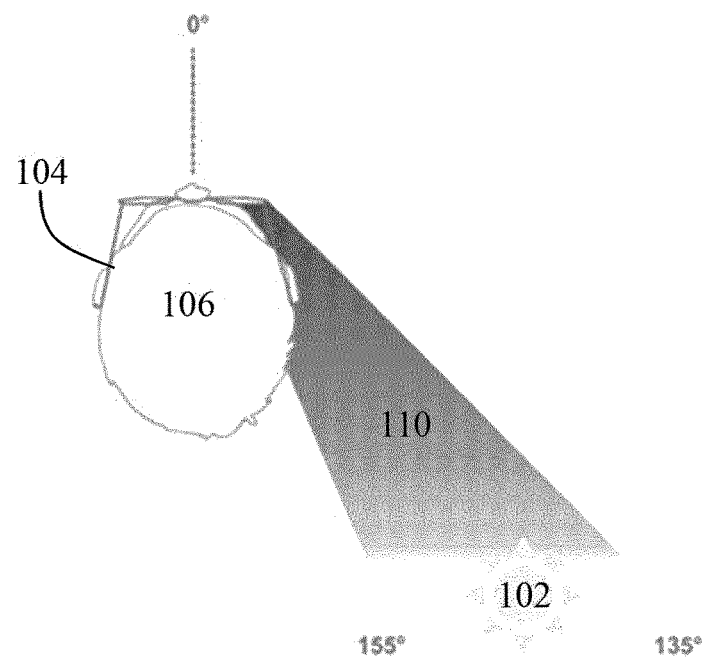
FIG. 1B is a schematic illustration of light paths to glasses of wearer from a backside, within the scope of the present disclosure.

Turning now to the figures, an exemplary illustration of light paths to glasses of a wearer from a front side and a backside may be shown with reference to FIGS. 1A and 1B within the scope of the present disclosure.

A light source 102 may be located at a front side of a wearer 106. The light source 102 may also be located at a backside of the wearer 106. The light from the light source 102 may pass through glasses 104 of the wearer 106 to reach the eyes of the wearer 106 if the light source 102 may be located at the front side of the wearer 106. The light from the light source 102 may be reflected from the glasses 104 to reach the eyes of the wearer. The light passing from the front side of the glasses may be shown in the optical path 108. The optical path 108 may be from 0 degrees to 90 degrees if the optical path in front of the wearer's nose may be set as 0 degrees. The light transmitting from the backside of the glasses may be shown in the optical path 110. The optical path 110 may be from 135 degrees to 155 degrees if the optical path in front of the wearer's nose may be set as 0 degrees. The light source may be a UV light source, a near-infrared light source, an infrared light source, a visible light source, e.g., a blue light source, a yellow light source, etc.

Figure 2:
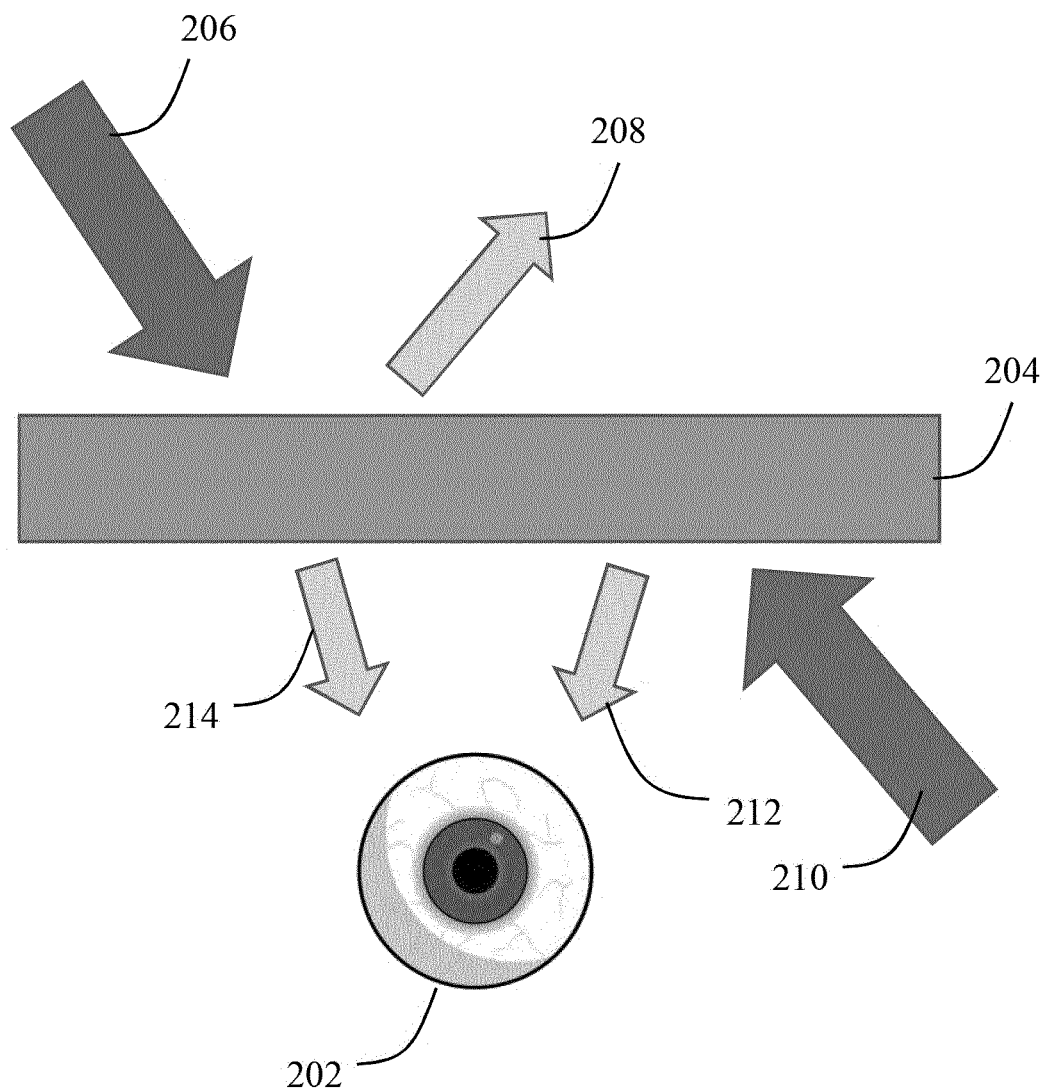
FIG. 2 is a schematic illustration of a near-infrared (NIR) light reflected into wearer's eyes, within the scope of the present disclosure.

With reference to FIG. 2, an exemplary schematic illustration of a near-infrared (NIR) light reflected into wearer's eyes may be presented within the scope of the present disclosure.

A reflection layer 204 may be located in front of wearer's eye 202. The reflection layer 204 may reflect an incident NIR light from the front surface of the reflection layer 204 and the back surface of the reflection layer 204. For example, the incident NIR light 206 from the front side of the reflection layer 204 may be partially reflected to become the reflected NIR light 208, and partially transmitted to become the transmitted NIR light 214. The incident NIR light 210 from the backside of the reflection layer 204 may be reflected into the direction of the wearer's eyes and become reflected NIR light 212. The reflected NIR light 212 and the transmitted NIR light 214 further travel into the wearer's eyes and may cause damages.

With reference to Table 1, a list of a percentage of NIR light transmission of ophthalmic lens by different NIR reflection technologies from different companies is presented. For example, the lowest percentage of NIR transmission is the reflection technology provided by HOLYHOLT which is 42%.

TABLE 1

Summary of TsIR % of ophthalmic lens using NIR reflection technology.

| COMPANY | RODENSTOCK | HOLY-HOLT | INDO | TOKAI |
|---|---|---|---|---|
| Brand | Red Sun 2 | Triple Care | Energy | Esc |
| Product | Sun | Clear | Clear | Clear |
| IR Protection Technology | Reflection by mirror coating | Reflection by anti-reflection coating | Reflection by anti-reflection coating | Reflection by anti-reflection coating |
| TsIR % | 67 | 42 | 45 | 55 |
| Tv % | 25 | 96.4 | 97.5 | 97.6 |

With reference to Table 2, an exemplary list of ISO requirements for sunglasses in NIR protection may be presented within the scope of the present disclosure. For example, ISO 12321-1 requires that the NIR light transmission for eye and face protection of sunglasses and related eyewear should be less than visible light transmission, e.g., TsIR≤Tv %, for all categories, where categories may be defined based on visible light transmission, Tv %, as defined in Table 2. With this requirement, if a reflection technology has a TsIR % for 42%, this reflection technology does not meet ISO requirements for categories 3 and 4 since the Tv % needs to be lower than 18%.

TABLE 2

ISO requirements on sunglasses for NIR protection.

| Category Number | Tv % | TsIR % |
|---|---|---|
| 0 | 80-100 | ≤Tv % |
| 1 | 43-80 | ≤Tv % |
| 2 | 18-43 | ≤Tv % |
| 3 | 8-18 | ≤Tv % |
| 4 | 3-8 | ≤Tv % |

Figure 3:
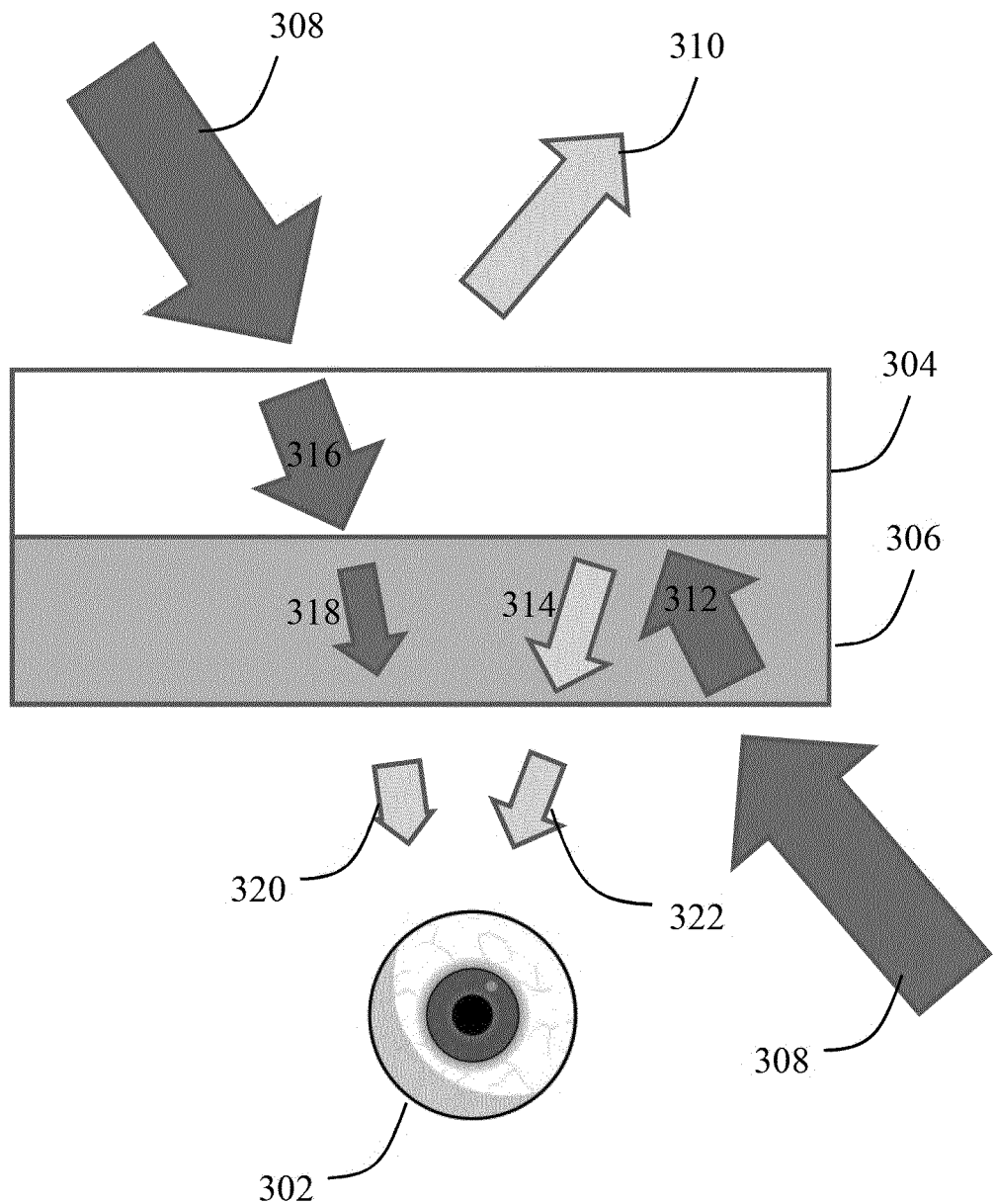
FIG. 3 is a NIR full shield laminate made with a near-infrared (NIR) reflection layer and a NIR absorption layer, within the scope of the present disclosure.

With reference to FIG. 3, an exemplary NIR full shield laminate made with a near-infrared (NIR) reflection layer and a NIR absorption layer may be presented within the scope of the present disclosure.

A novel laminate with full NIR shield capability with a NIR reflection layer and a NIR absorption layer may be shown in FIG. 3. The laminate may be made of two layers of film in a particular order, e.g., the NIR reflection layer 304 may be a front layer of the laminate and the NIR absorption layer 306 of the laminate may be a bottom layer. The front side of the laminate has a NIR reflection function and the backside of the laminate has a NIR absorption function. Such an arrangement may prevent backside NIR reflection while providing desired NIR blocking. In order to absorb the reflection, the absorption film 306 has at least one absorption peak or spectra matching one reflection peak or spectra from the reflection film 304.

As illustrated in FIG. 3, a NIR light 308 may be incident from the laminate's front side. The incident NIR light 308 may be partially reflected by the NIR reflection layer 304 and then partially absorbed by NIR absorption layer 306, before reaching the wearer's eye 302 as light 320 A NIR light 308 incoming from laminate's backside may be partially absorbed by the NIR absorption layer 306. The transmitted light 312 may be partially reflected by the NIR reflection layer 304. The reflected light 314 may be partially absorbed again by the NIR absorption layer 306 before reaching the wearer's eye 302 as light 322. In order to absorb the reflection, the absorption film 306 may have at least one absorption peak or spectra matching one reflection peak or spectra from the reflection film 304. Thus, the complete NIR protection from the wearer's eyes may be achieved.

Figure 4:
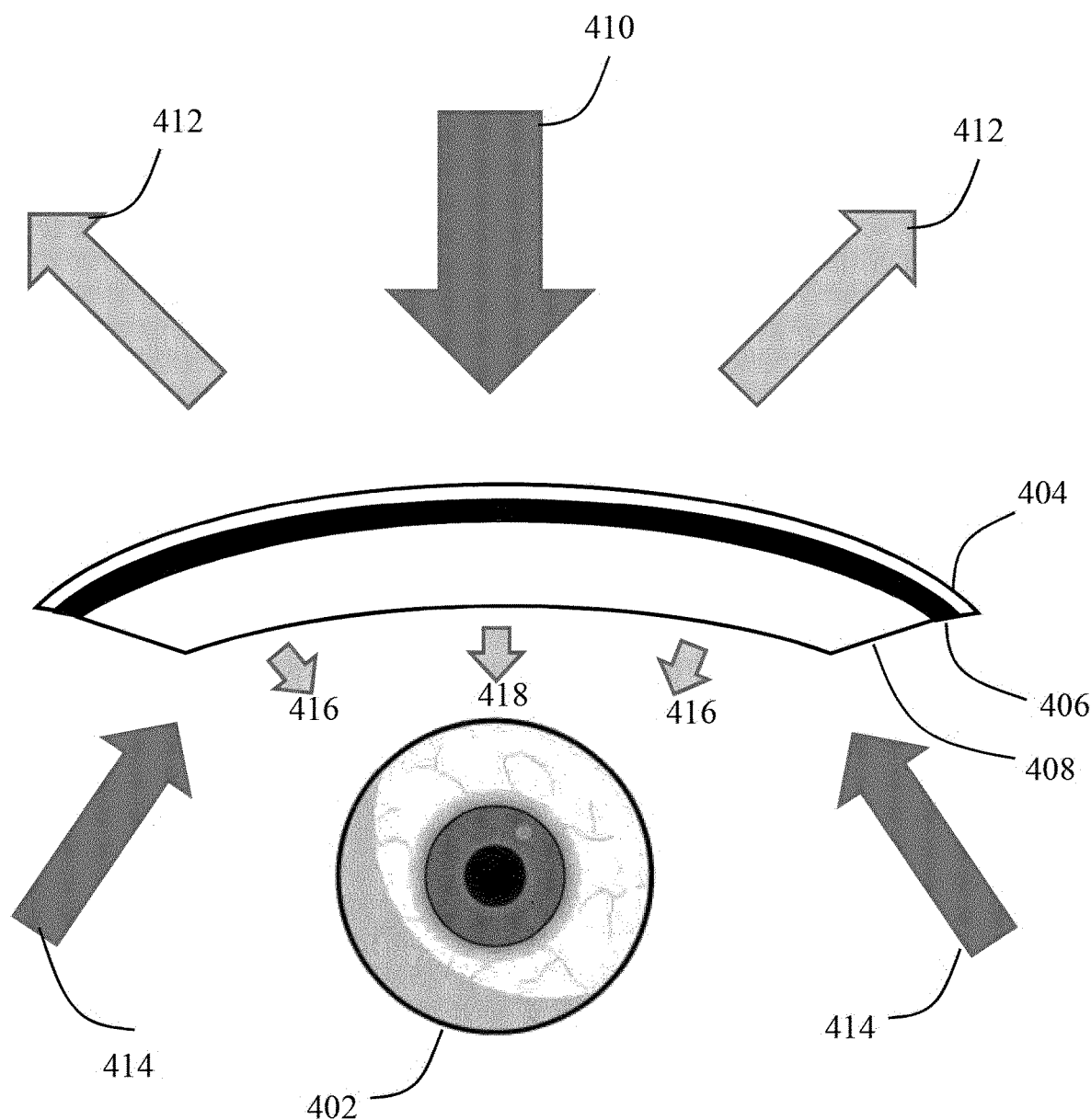
FIG. 4 is a NIR full shield laminate made with a near-infrared (NIR) reflection layer and a NIR absorption layer integrated with another layer or a lens, within the scope of the present disclosure.

With reference to FIG. 4, an exemplary NIR full shield laminate having a near-infrared (NIR) reflection layer and a NIR absorption layer integrated with another layer or a lens may be presented within the scope of the present disclosure.

The integration may be performed, but not limited to, by lamination or an injection molding. As described earlier, a NIR light 410 may be incident from the laminate's front side. The incident NIR light 410 may be reflected by the NIR reflection layer 404 to be reflected light 412. The transmitted light from the NIR light 410 may be then absorbed by NIR absorption layer 406. The NIR absorption layer 406 may be on another layer or a lens 408, e.g., an ophthalmic lens. A NIR light 414 incoming from laminate's backside may be absorbed by the NIR absorption layer 406. In order to absorb the reflection, the absorption film 406 may have at least one absorption peak or spectra matching one reflection peak or spectra from the reflection film 404. Thus, the complete NIR protection from the wearer's eyes 402 may be achieved.

Figure 5:
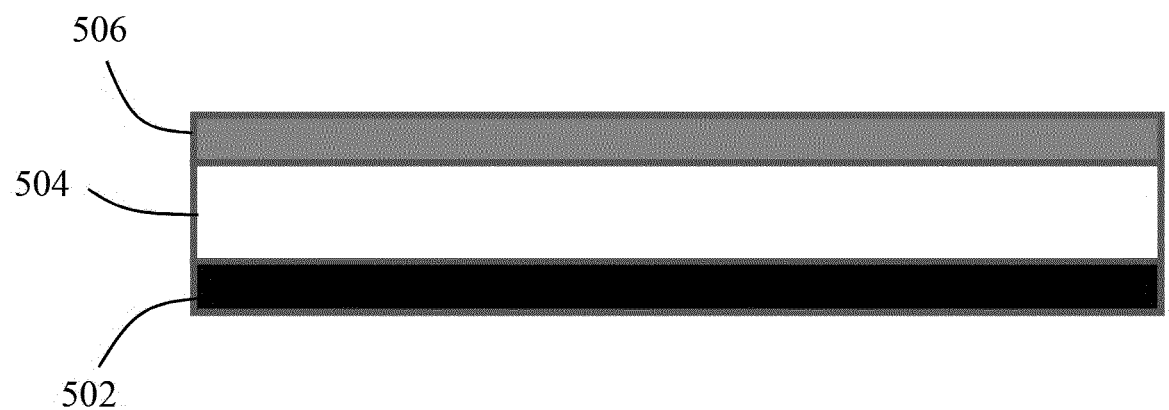
FIG. 5 is a NIR reflection film, within the scope of the present disclosure.

With reference to FIG. 5, an exemplary NIR reflection film with three layers may be presented within the scope of the present disclosure.

The film may be, for example, a MF400 film. The MF400 film includes a PET film 504 coated with a nano silver particle coating 502 on the backside of the PET film to reflect the NIR light. The MF 400 film may be made by Fujifilm. The front side of the PET film may be a hard coating layer 506. The hard coating layer 506 may be a protection layer used to protect the PET film 504 and the nano silver particle coating 502.

Figure 6A:
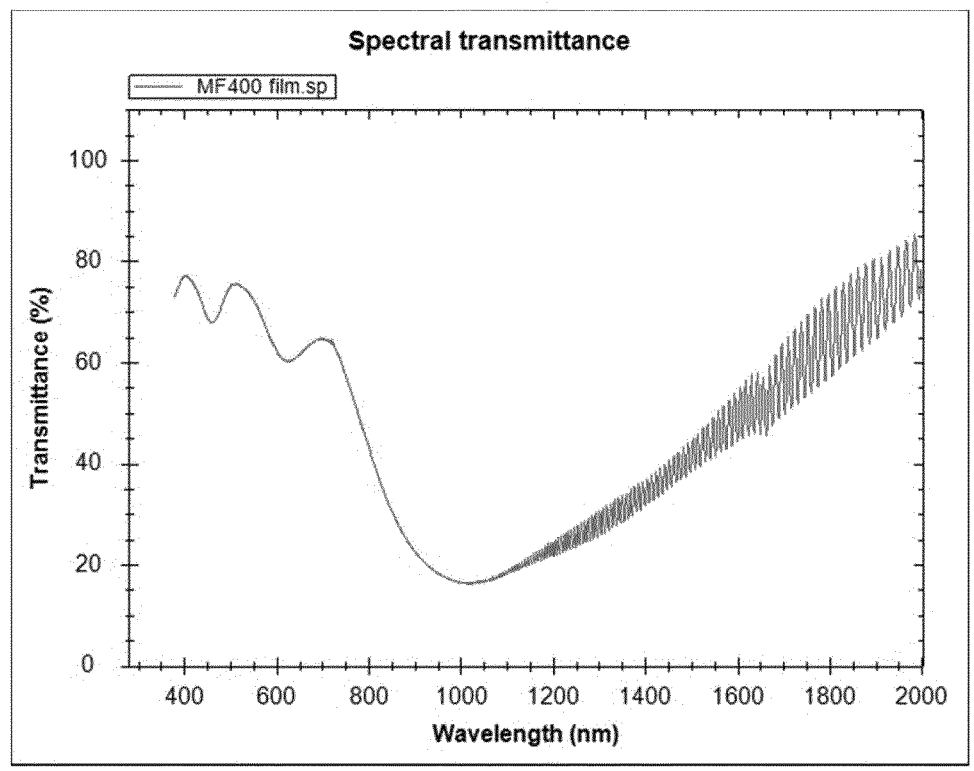
FIGS. 6A and 6B are a transmission curve and a reflection curve of the MF 400 film, within the scope of the present disclosure.
Figure 6B:
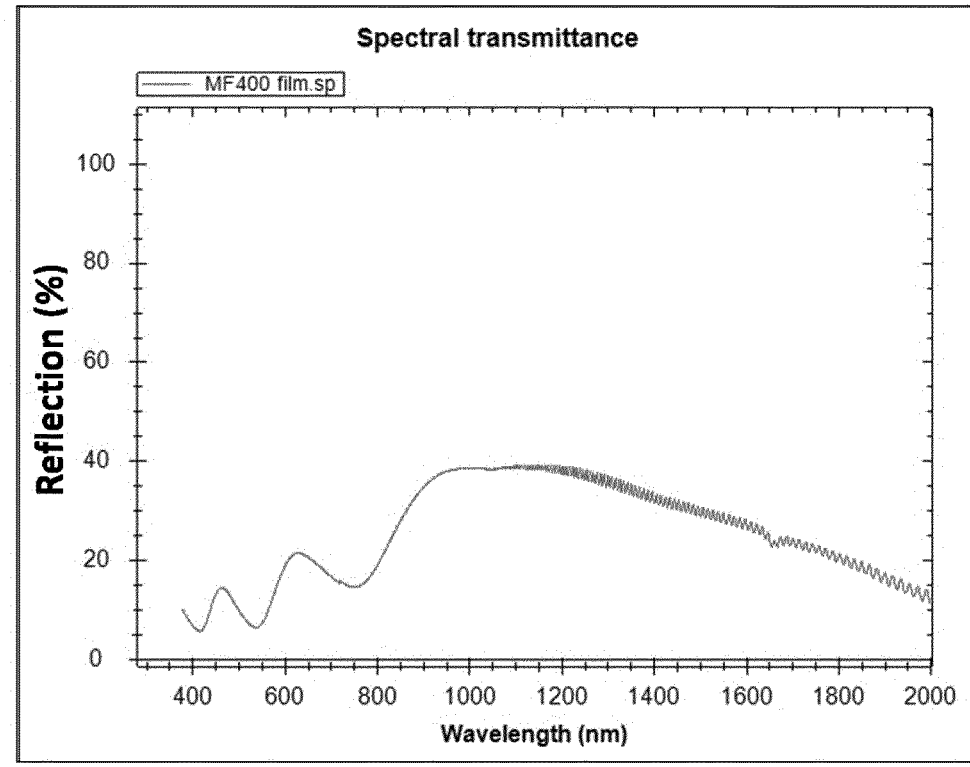

With reference to Table 3, exemplary properties of a MF400 film may be presented within the scope of the present disclosure. With reference to FIGS. 6A and 6B, an exemplary transmission curve and an exemplary reflection curve of the MF 400 film may be also presented within the scope of the present disclosure.

Comparative Example 1

The transmission may be measured from a front side of the MF 400 film or the side with the hard coating layer 506. The reflection may be measured from a backside of the MF 400 film or the side with a silver nano particle coating 502. As shown in Table 3, the TsIR % of the MF 400 film may be 29.6%, which may be much lower than other reflection technologies in Table 1. However, the MF 400 film may be still not ISO conformable at categories 3 and 4 as listed in Table 2. The NIR light reflection from the backside is noticeable which is 31.8%. The reflection peak has the Amax at 1100 nm with a Half Width at Half Maximum (HWHM) of 300 nm.

TABLE 3

MF 400 film properties.

| Sample name | | Visible light total transmission Tv % (D65) | NIR light total transmission TsIR$_{780-2000}$ | NIR light reflection at AOI of 35° RsIR$_{780-2000}$ | NIR light reflection peak $\lambda_{max}$ ± HWHM (nm) | ISO conformity |
|---|---|---|---|---|---|---|
| Counter Ex. 1 | MF400 film | 69.6 | 29.6 | 31.8 | 1100 ± 300 | Cate. 1, 2 |
| | Pros. | \multicolumn{5}{l}{Lower TsIR than other NIR reflection technologies, e.g., mirror coating, oranti-reflection coating.} | |
| | Cons. | \multicolumn{5}{l}{NIR light reflected from backside.} | |

Figure 7:
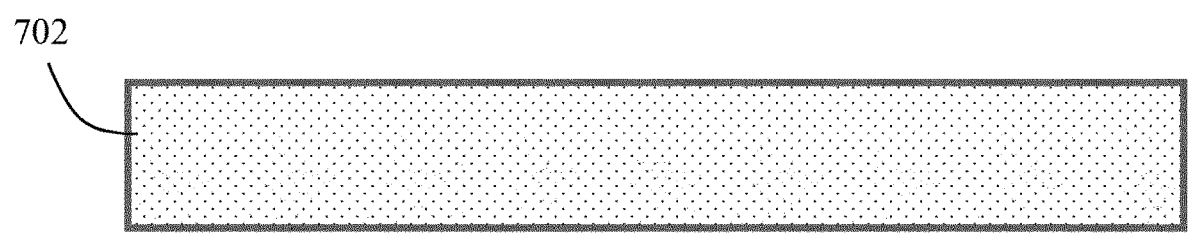
FIG. 7 is a Polycarbonates (PC) film extruded with PC resin mixed with NIR light filter, within the scope of the present disclosure.
Figure 8A:
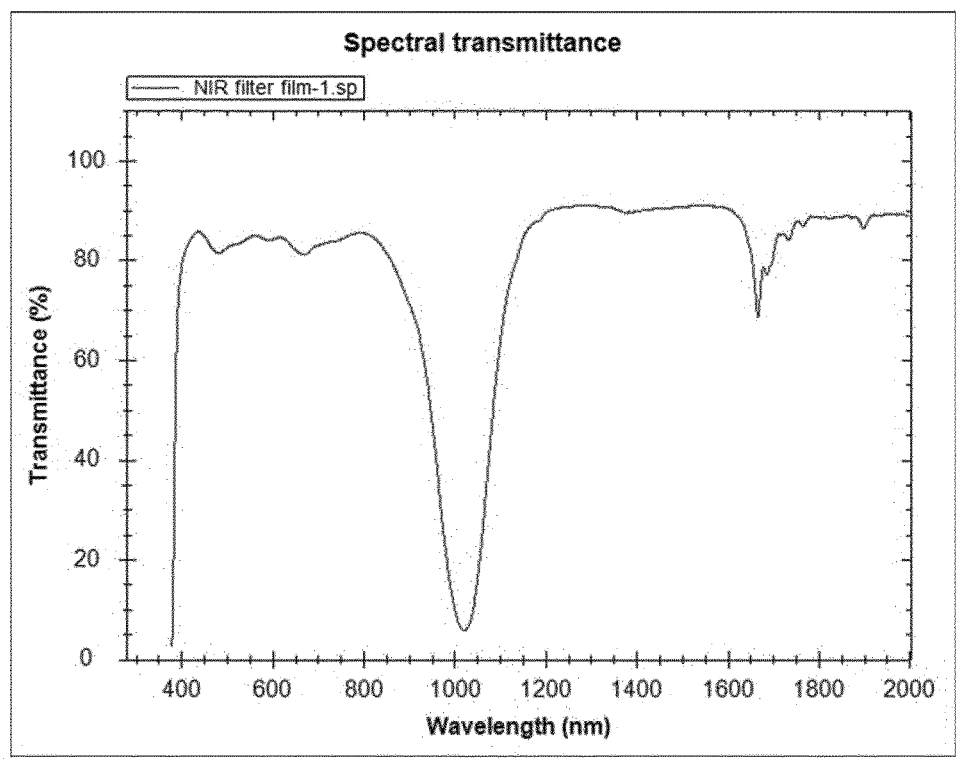
FIGS. 8A and 8B are a transmission curve and a reflection curve of the Polycarbonates (PC) film with NIR light filters, within the scope of the present disclosure.
Figure 8B:
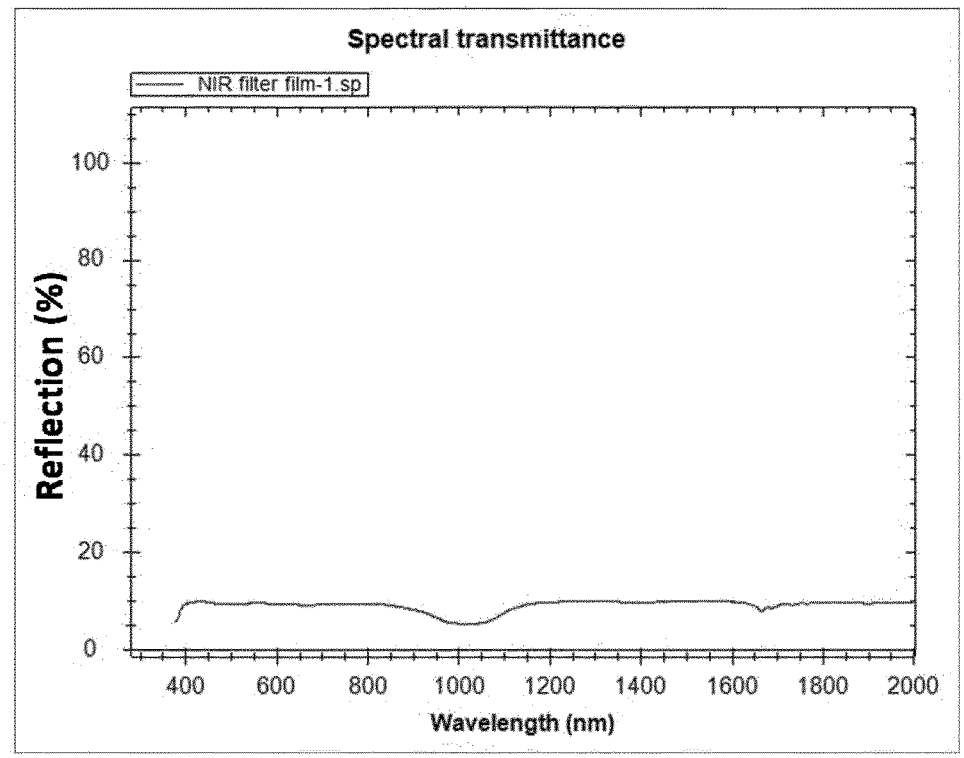

With reference to FIG. 7, an exemplary PC film extruded with PC resin mixed with NIR light filter 702 may be presented within the scope of the present disclosure. Non-limiting examples of the NIR filters may include polymethine, phthalocyanine, porphyrine, triphenylmethane, iminium, squarylium, croconium, dithiolene, quinone, polyperylene, pyrilium, thiopyrilium, cyanine, or any combination thereof. The NIR filter film-1 and the NIR filter film-2 may have different NIR filters, and/or a different concentration of NIR filters, and/or a different absorption range, and/or different absorption percentage With reference to Table 4, exemplary properties of NIR filter film-1 may be presented within the scope of the present disclosure. With reference to FIGS. 8A and 8B, an exemplary transmission curve and an exemplary reflection curve of the Polycarbonates (PC) film with NIR light filters may be presented within the scope of the present disclosure.

Comparative Example 2

Figure 9:
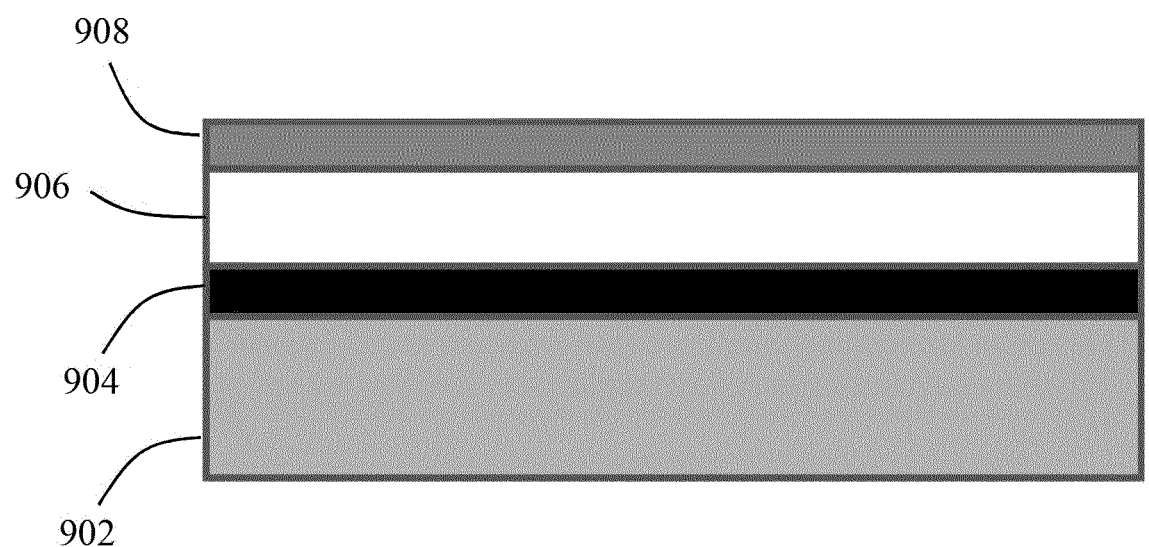
FIG. 9 is a NIR full shield laminate made with a PET film, a hard coating layer, a silver nanoparticle coating, and a Polycarbonates (PC) film with NIR light filters, within the scope of the present disclosure.

As shown in Table 4, the TsIR % of the NIR filter film-1 may be 67.3%, which may be close to the TsIR % of Red Sun 2 by Rodenstock, but still higher than other reflection technologies in Table 1. Thus, the NIR filter film-1 may be not ISO conformable at Cat. 2, 3&4. However, an advantage may be that there is a much lower NIR light reflected from the backside, which may be 8.2%, however, the NIR light may be only a quarter of the reflected light from MF 400. The absorption peak of the NIR filter film-1 has a Amax at 1030 nm, which may be close to the absorption peak of MF 400 with a HWHM 100 nm, which may be only one third of the HWHM of MF 400's reflection peak.

laminated onto a PC NIR filter film using a pressure-sensitive adhesive (PSA). Other types of adhesive or bonding techniques may be used. MF400 may be used on the front side of the laminate and PC NIR filter film may be used on the backside of the laminate as shown in FIG. 9. The NIR filter film may be, but not limited to, NIR filter film-1 and NIR full shield laminate-2.

Figure 10:
FIG. 10 is a NIR full shield laminate made with a PET film, a hard coating layer, a silver nanoparticle coating, a Polycarbonates (PC) film with NIR light filters on a lens substrate, within the scope of the present disclosure.

With reference to FIG. 10, an exemplary NIR full shield laminate made with a PET film 1008, a hard coating layer 1010, a silver nanoparticle coating 1006, a Polycarbonates (PC) film with NIR light filters 1004 on a lens substrate 1002 may be presented within the scope of the present disclosure.

As described earlier, the NIR full shield laminate may be bonded to the lens substrate 1002 using a pressure-sensitive adhesive (PSA). Other types of adhesive or bonding techniques may be used. MF400 may be used on the front side of the laminate and PC NIR filter film may be used on the backside of the laminate as shown in FIG. 10. The NIR filter film may be, but not limited to, NIR filter film-1 and NIR full shield laminate-2.

Figure 11A:
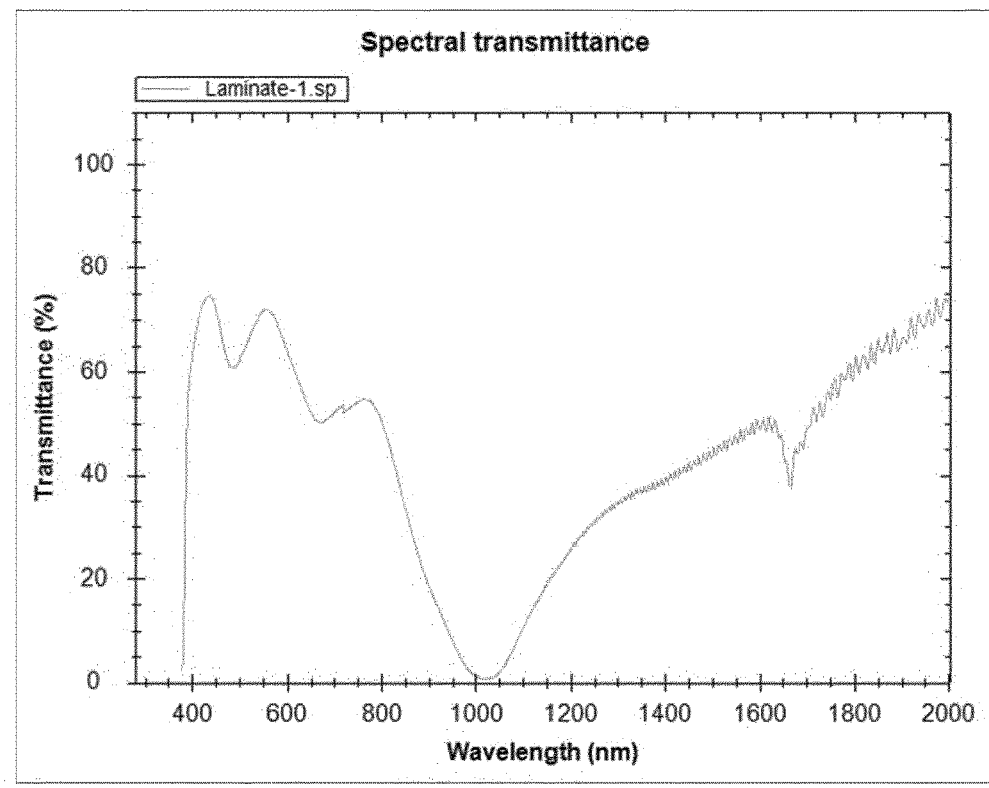
FIGS. 11A and 11B is a transmission curve of NIR full shield laminate-1 and a reflection curve of NIR full shield laminate-1, within the scope of the present disclosure.
Figure 11B:
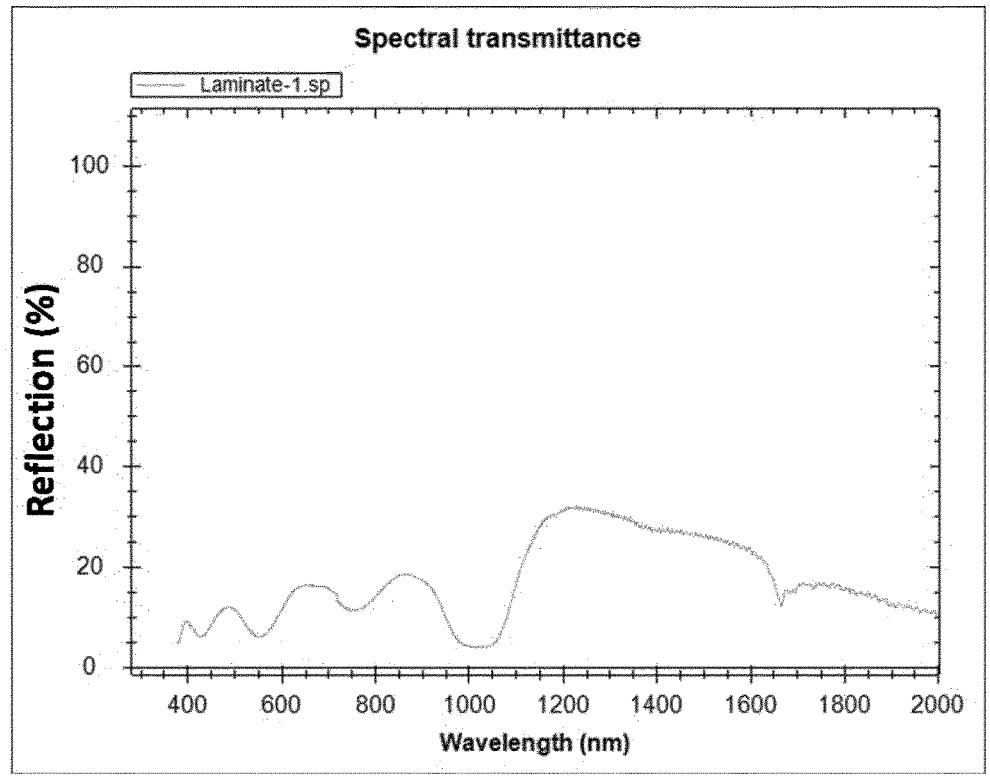

With reference to FIGS. 11A and 11B, an exemplary transmission curve of NIR full shield laminate-1 and a reflection curve of NIR full shield laminate-1 may be presented within the scope of the present disclosure.

Working Example 1

As shown in Table 5, the TsIR % of the NIR full shield laminate-1 may be 27.2%, which may be lower than the TsIR % of MF400 or PC NIR filter film-1 alone. The RsIR of the NIR full shield laminate-1 may be 17.0%, which may be also lower than the RsIR of MF400. A deep drop at

TABLE 4

NIR filter film-1's properties.

| Sample name | NIR filter | NIR filter conc. | Visible light total transmission Tv % (D65) | NIR light total transmission TsIR$_{780-2000}$ | NIR light absorption peak ($\lambda_{max}$ ± HWHM) nm | NIR light reflection at AOI of 35° RsIR$_{780-2000}$ | ISO conformity |
|---|---|---|---|---|---|---|---|
| Counter Ex. 2 | NIR filter film-1 | NIR filter-1 | 350 ppm | 83.9 | 67.3 | 1030 ± 100 | 8.2 | Cat. 0, 1 |
| | Pros. | \multicolumn{6}{l}{Very low NIR reflection} | |
| | Cons. | \multicolumn{6}{l}{Only conform to ISO Categories 0 and 1} | |

1030±100 nm on the reflection curve in FIG. 11A indicating that the reflected NIR light from MF400 may be absorbed by the NIR filter film-1. The transmission curve in FIG. 11B, on the other hand, has a much lower value than that of MF400 or NIR filter film-1, indicating that more NIR light may be blocked. This laminate shows an improvement comparing with MF400 and PC NIR filter film alone.

With reference to FIG. 9, an exemplary NIR full shield laminate made with a PET film, a hard coating layer, a silver nanoparticle coating, and a Polycarbonates (PC) film with NIR light filters may be presented within the scope of the present disclosure.

MF400 layer including a hard coating layer 908, PET film 906, and a silver nano particle coating layer 904 may be

TABLE 5

NIR full shield laminate-1's properties.

| | Sample name | Top layer | Bottom layer | Visible light total transmission Tv % (D65) | NIR light total transmission $TsIR_{780-2000}$ | NIR light reflection at AOI of 35° $RsIR_{780-2000}$ | ISO conformity |
|---|---|---|---|---|---|---|---|
| Working Ex. 1 | NIR full shield laminate-1 | MF400 | NIR filter film-1 | 67.0 | 27.2 | 17.0 | Cat. 1, 2 |
| | Pros. Cons. | | | Very low NIR light transmission, low NIR light reflection ISO not conformable at Cat. 3&4. But this may be solved using a film with higher NIR filter conc. and/or broader NIR filter absorption range, to decrease TsIR. | | | |

Using a film with a higher NIR filter concentration and a broader NIR filter absorption range, e.g., NIR filter film-2, and laminating this film with MF400, e.g., NIR full shield laminate-2, may provide a lower TsIR % and RsIR %.

Comparative Example 3

Figure 12A:
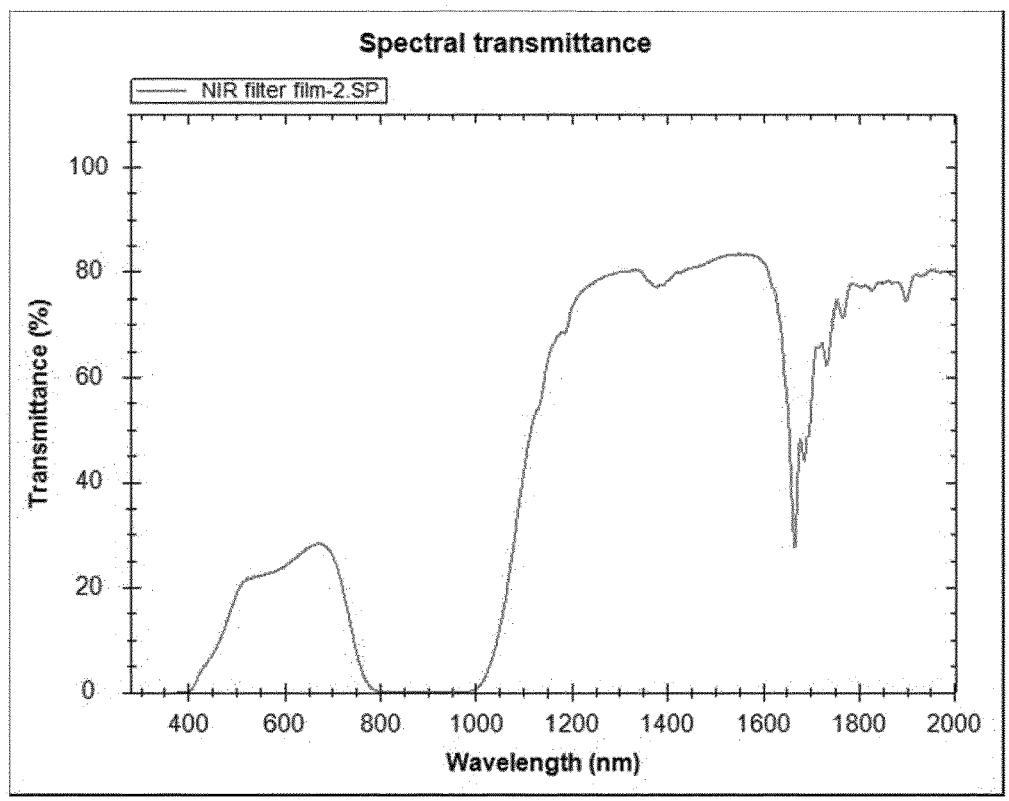
FIGS. 12A and 12B are a transmission curve of NIR filter film-2 and a reflection curve of NIR filter film-2, within the scope of the present disclosure.
Figure 12B:
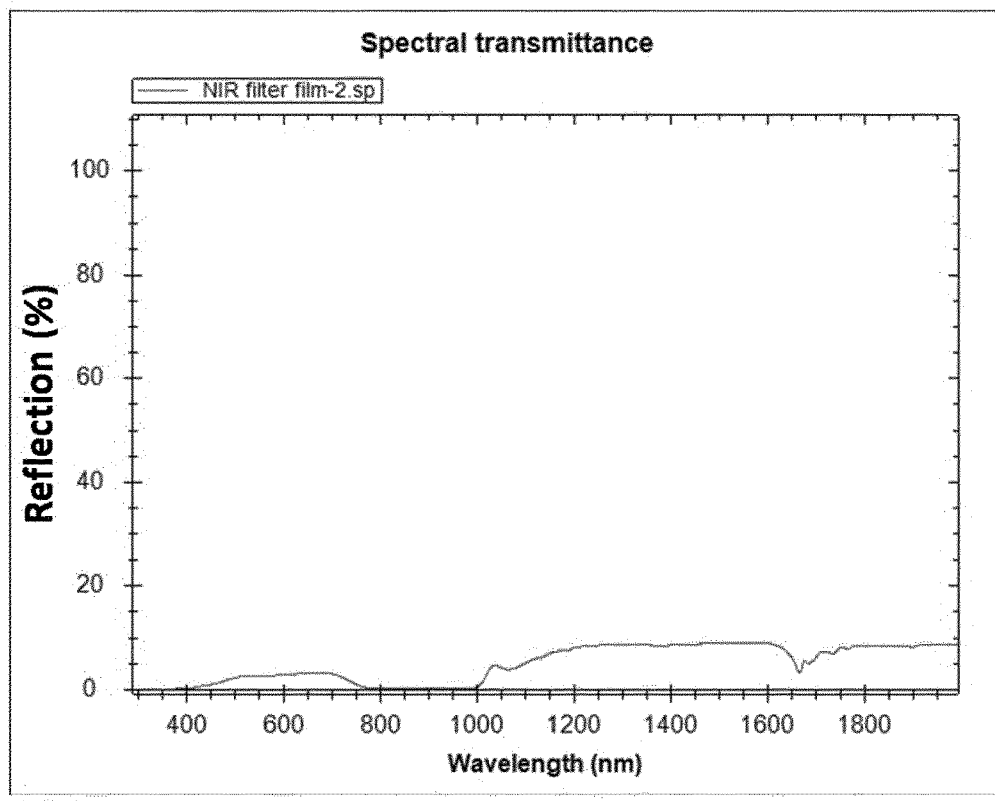

With reference to FIGS. 12A and 12B, an exemplary transmission curve of NIR filter film-2 and a reflection curve of NIR filter film-2 may be presented within the scope of the present disclosure.

As shown in Table 6, although adding more NIR filters may decrease the TsIR, Tv % may also be reduced. However, the Tv % may be less than the TsIR, which makes the film not ISO conformable. As illustrated in FIGS. 12A and 12B, the absorption peak of NIR filter film-2 has λmax at 900 nm with a HWHM of 200 nm, which may be close to the absorption peak of MF400.

TABLE 6

NIR filter film-2's properties.

| | Sample name | NIR filter | NIR filter conc. | Visible light total transmission Tv % (D65) | NIR light total transmission $TsIR_{780-2000}$ | NIR light absorption peak ($\lambda_{max} \pm$ HWHM) nm | NIR light reflection at AOI of 35° $RsIR_{780-2000}$ | ISO conformity |
|---|---|---|---|---|---|---|---|---|
| Counter Ex. 3 | NIR filter film-2 | NIR filter 2 & 3 | NIR2: 500 ppm NIR3: 1200 ppm | 21.9 | 29.5 | 900 ± 200 | 3.5 | No |
| | Pros. Cons. | | | Very low NIR reflection Not ISO conformable | | | | |

Working Example 2

Figure 13A:
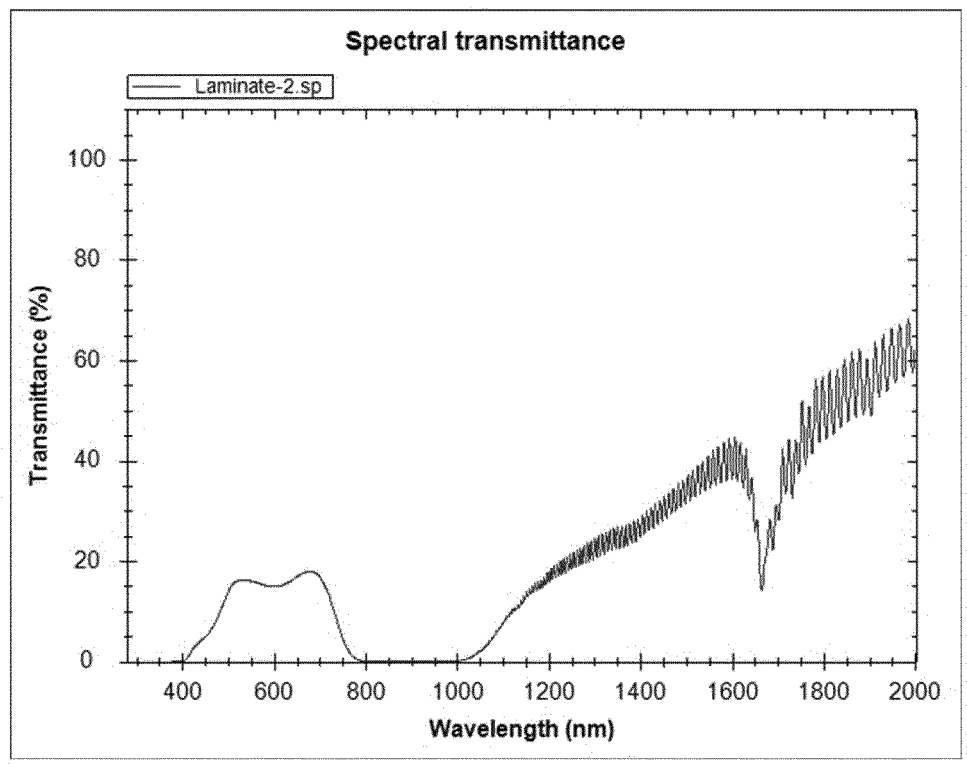
FIGS. 13A and 13B are a transmission curve of NIR full shield laminate-2 and a reflection curve of NIR full shield laminate-2, within the scope of the present disclosure.
Figure 13B:
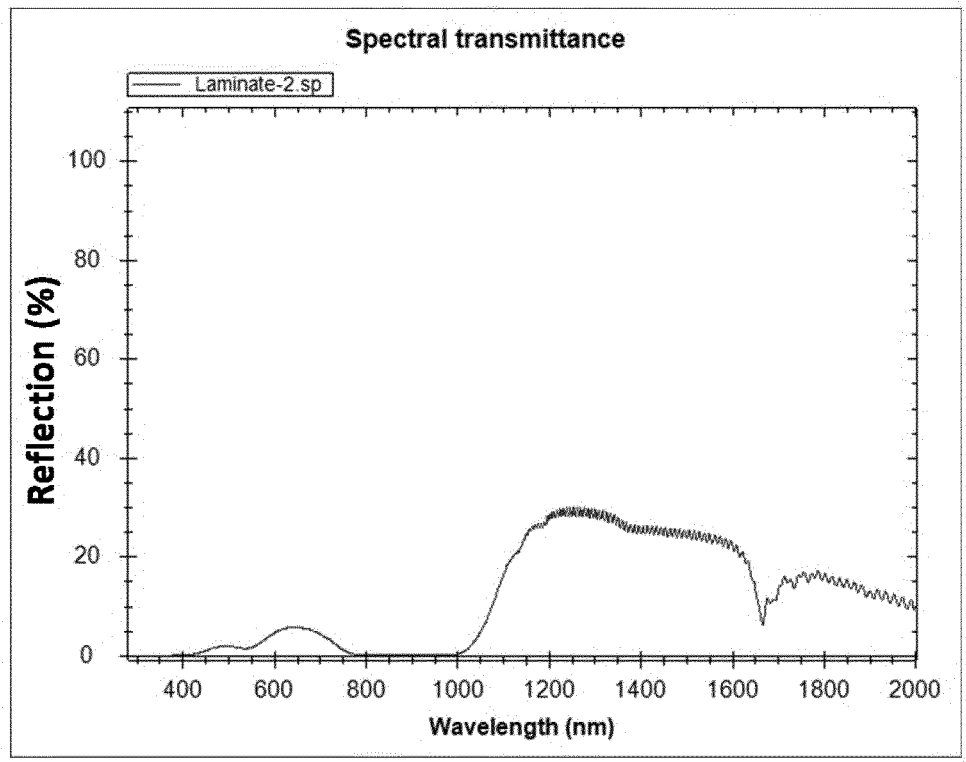

With reference to FIGS. 13A and 13B, an exemplary transmission curve of NIR full shield laminate-2 and an exemplary reflection curve of NIR full shield laminate-2 may be presented within the scope of the present disclosure.

As shown in Table 7, after laminating NIR filter film-2 with MF400, the TsIR of the NIR full shield laminate-2 may be further decreased to 9.9%, but Tv % may be only slightly reduced. A deep drop to 0% at 900±100 nm on the reflection curve may be shown in FIG. 13A indicating that the reflected NIR light from MF400 may be fully absorbed by the NIR filter film-2 at 800-1000 nm. As shown in FIG. 13B, the transmission curve has lower value than the transmission curve of MF400 or NIR filter film-2 indicating that more NIR light is blocked.

The laminate in the working example 2 may be conformable to ISO at Category 3. By adding more NIR filters, ISO conformity at Category 4 may also be reached. The NIR light reflected from the backside may be also lower than the NIR light reflected from the backside of NIR full shield laminate-1.

film may be less than the flux of NIR light coming from the front side of the laminate film and the majority of the NIR light may be blocked by the head of the wearer, the quality of NIR shielding from the backside of the laminate film may be still acceptable comparing to the NIR shielding from the front side of the laminate film.

TABLE 7

NIR full shield laminate-2's properties

| | Film name | Top layer | Bottom layer | Visible light total transmission Tv % (D65) | NIR light total transmission TsIR$_{780-2000}$ | NIR light reflection at AOI of 35° RsIR$_{780-2000}$ | ISO conformity |
|---|---|---|---|---|---|---|---|
| Working Ex. 2 | NIR full shield laminate-2 | MF400 | NIR filter film-2 | 21.0 | 9.9 | 9.8 | Cat. 3 |
| Pros. | | | | Very low NIR light transmission, low NIR light reflection | | | |

Figure 14A:
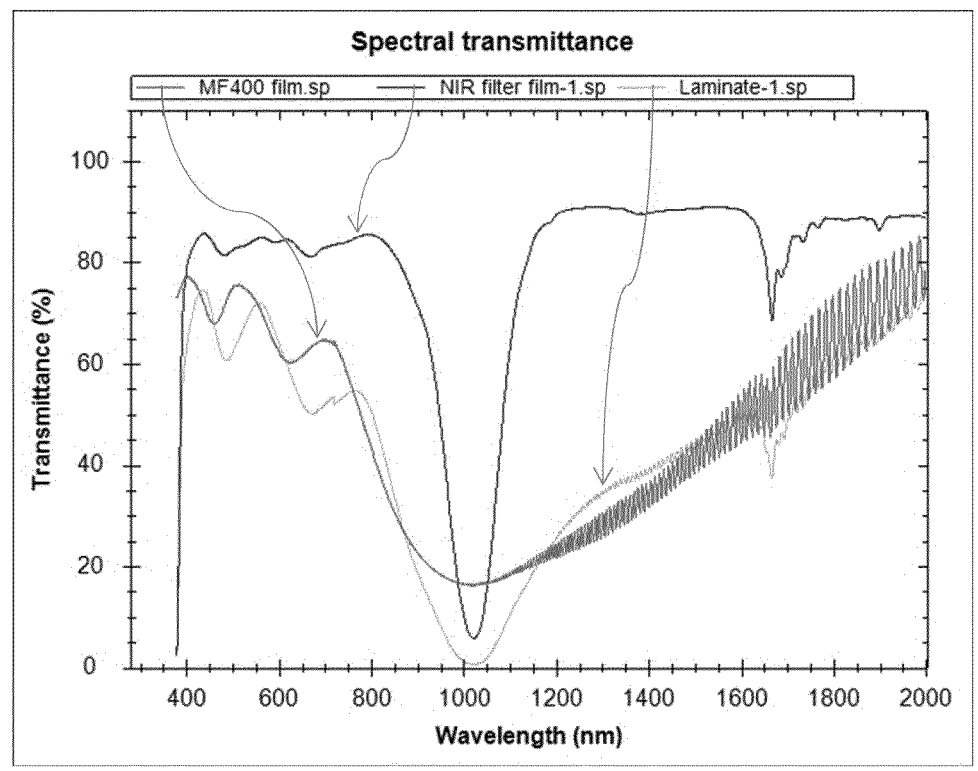
FIGS. 14A and 14B are transmission curves and reflection curves of MF400, NIR filter film-1, and NIR full shield laminate filter-1, within the scope of the present disclosure.
Figure 14B:
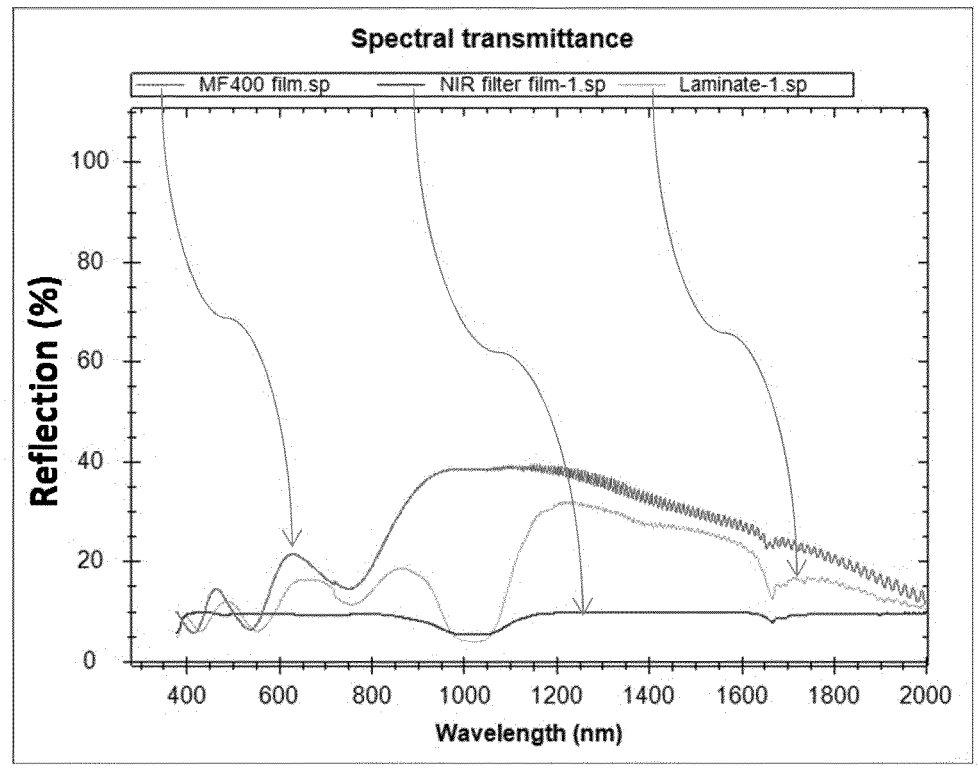
Figure 15A:
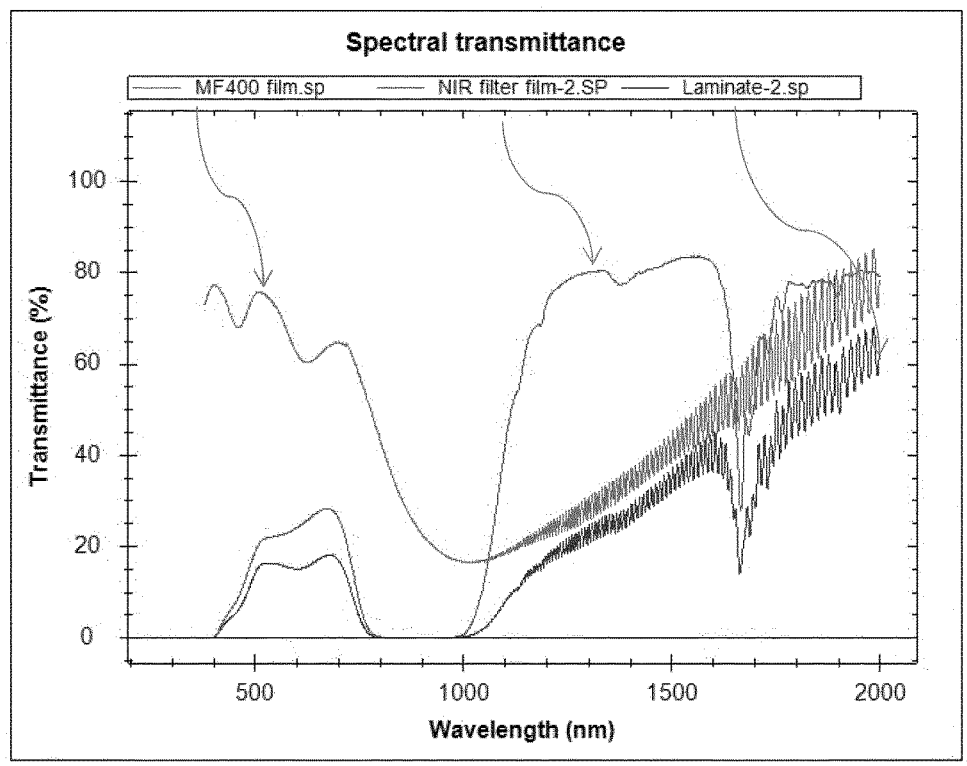
FIGS. 15A and 15B are transmission curves and reflection curves of MF400, NIR filter film-2, and NIR full shield laminate filter-2, within the scope of the present disclosure.
Figure 15B:
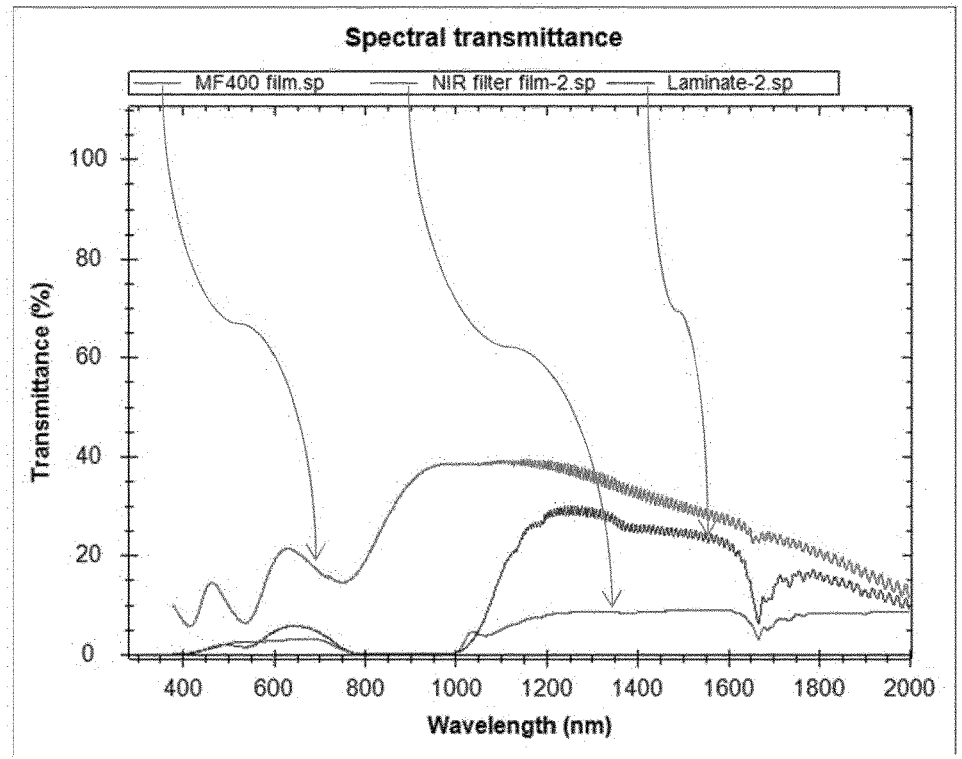

Summary of above results may be listed in Table 8 and FIGS. 14A, 14B, 15A, and 15B. FIGS. 14A and 14B may be transmission curves and reflection curves of MF400, NIR filter film-1, and NIR full shield laminate filter-1, and FIGS. 15A and 15B may be transmission curves and reflection curves of MF400, NIR filter film-2, and NIR full shield laminate filter-2 within the scope of the present disclosure.

As shown in Table 8, the NIR full shield laminate (Working ex. 1 and ex. 2) shows an improvement over the MF400 (Counter Ex. 1) and PC NIR filter films (Counter Ex. 2&3). They may be conformable to ISO requirements at category 1, 2 or 3, for NIR protection on Sunwear, which requires TsIR %<Tv %, and have much less backside reflection. The NIR filter film-1 or NIR filter film-2 has an absorption peak that may be similar or close to the reflection peak of MF400 as shown in FIGS. 14A, 14B, 15A, and 15B. This may be very important since the reflected light from the backside of the MF400 may be absorbed by the NIR filter film.

TABLE 8

Summary of properties of MF400, PC NIR filter film, NIR full shied laminate

| Example | Sample name | Visible light total transmission Tv % (D65) | NIR light total transmission TsIR$_{780-2000}$ | NIR light reflection at AOI of 35° RsIR$_{780-2000}$ | ISO conformity |
|---|---|---|---|---|---|
| Counter Ex. 1 | MF400 | 69.6 | 29.6 | 31.8 | Cat. 1, 2 |
| Counter Ex. 2 | PC NIR filter film-1 | 83.9 | 67.3 | 8.2 | Cat. 0, 1 |
| Counter Ex. 3 | PC NIR filter film-2 | 21.9 | 29.5 | 3.5 | No |
| Working Ex.1 | NIR full shield laminate-1 | 67.0 | 27.2 | 17.0 | Cat. 1, 2 |
| Working Ex.2 | NIR full shield laminate-2 | 21.0 | 9.9 | 9.8 | Cat. 3 |

The particular configuration of the feature is also important. Currently, the configuration may be substrate/absorbing film/reflecting film/hard coating from a bottom to a top of the laminate film, which led to the performance as presented in Table 8.

If the configuration may be substrate/reflecting film/absorbing film/hard coating from a bottom to a top of the laminate film, the NIR reflection performance may be less. The NIR reflection performance may be lower for NIR light coming from the backside of the laminate film. However, since the flux of NIR light from the backside of the laminate Obviously, numerous modifications and variations are possible in light of the above teachings. It is therefore to be understood that within the scope of the appended claims, the invention may be practiced otherwise than as specifically described herein.

Embodiments of the present disclosure may also be as set forth in the following parentheticals.

(1) A laminate film structure for a wearer, intended for reflecting and absorbing near-infrared light, comprising a near-infrared reflection layer reflecting the near-infrared light that is incident on the near-infrared reflection layer, and a near-infrared absorption layer disposed between an eye of the wearer and the near-infrared reflection layer, the near-infrared reflection layer being disposed on the near-infrared absorption layer and the near-infrared absorption layer absorbing the near-infrared light.

(2) The laminate film structure according to (1), wherein the near-infrared absorption layer is a thermoplastic film including thermoplastic resin and one or more near-infrared light filters.

(3) The laminate film structure according to any one of (1) and (2), wherein each of the one or more near-infrared light filters has a different concentration and a different absorption range between 780 nm and 2000 nm, e.g., 800 nm, 900 nm, 1000 nm, 1100 nm, 1200 nm, 1300 nm, 1400 nm, 1500 nm, 1600 nm, 1700 nm, 1800 nm, 1900 nm, or 1950 nm.

(4) The laminate film structure according to any one of (1) and (2), wherein a first near-infrared light absorption layer of the one or more near-infrared light filters has at least one near-infrared light absorption peak within at least one of the following ranges: 780-880 nm, 960-1080 nm, 1180-1320 nm, and 1480-1760 nm, and a percentage of reflection of the near-infrared light from the first near-infrared light absorption layer is less than 9%, 8%, 7%, 6%, 5%, 4%, 3%, 2%, or 1%.

(5) The laminate film structure according to (1), wherein the near-infrared reflection layer includes: a thermoplastic film with a silver nano-particle coating, or a multilayer infrared reflecting film, or a thermoplastic film with a nano-ceramic coating, or a thermoplastic film with an anti-reflection coating, or a thermoplastic film with a mirror coating.

(6) The laminate film structure according to (1), wherein near-infrared light transmission of the near-infrared reflection layer is less than 30%, 25%, 20%, 15%, 10%, 5% or 1%, and near-infrared light reflection of the near-infrared reflection layer is larger than 31%, 40%, 50%, 60%, 70%, 80%, 90%, 95%.

(7) The laminate film structure according to (1), wherein a near-infrared light reflection peak of the near-infrared reflection layer is between 780 nm and 2000 nm, e.g., 800 nm, 900 nm, 1000 nm, 1100 nm, 1200 nm, 1300 nm, 1400 nm, 1500 nm, 1600 nm, 1700 nm, 1800 nm, 1900 nm, or 1950 nm.

(8) The laminate film structure according to (1), wherein at least one near-infrared light absorption peak of the near-infrared absorption layer substantially matches at least one near-infrared light reflection peak of the near-infrared reflection layer.

(9) The laminate film structure according to (1), wherein the near-infrared reflection layer is an outer layer of the laminate film structure.

(10) The laminate film structure according to (1), wherein an ophthalmic lens is disposed between the near-infrared absorption layer and the eye of the wearer.

(11) The laminate film structure according to any one of (1) and (10), wherein the near-infrared absorption layer is integrated with the ophthalmic lens.

(12) The laminate film structure according to (1), wherein the near-infrared absorption layer absorbs a transmitted near-infrared light, the transmitted near-infrared light first passing through the near-infrared reflection layer.

(13) The laminate film structure according to (1), wherein the near-infrared absorption layer absorbs a reflected near-infrared light, the reflected near-infrared light first passing through the near-infrared absorption layer and then reflecting from the backside of the near-infrared reflection layer.

(14) A method of reducing near-infrared light exposure to an eye by a laminate film structure on an eyewear, comprising absorbing near-infrared light by a first layer of the laminate film structure, the first layer located between the eye and a second layer, and reflecting the near-infrared light by the second layer of the laminate film structure, the second layer located on the first layer.

(15) An eyewear structure for protecting an eye from near-infrared light, comprising an ophthalmic lens, a near-infrared absorption layer disposed on the ophthalmic lens, the near-infrared absorption layer absorbing the near-infrared light, and a near-infrared reflection layer disposed on the near-infrared absorption layer, the near-infrared reflection layer reflecting the near-infrared light, wherein the ophthalmic lens is disposed between the eye and the near-infrared absorption layer, and wherein the near-infrared absorption layer is disposed between the ophthalmic lens and the near-infrared reflection layer.

(16) The eyewear structure according to (15), wherein a total near-infrared light transmission through the eyewear structure is less than a total visible light transmission through the eyewear structure.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A laminate film structure for a wearer, intended for reflecting and absorbing near-infrared light, comprising:
   a near-infrared reflection layer reflecting the near-infrared light that is incident on the near-infrared reflection layer; and
   a near-infrared absorption layer disposed between an eye of the wearer and the near-infrared reflection layer, the near-infrared reflection layer being disposed on the near-infrared absorption layer and the near-infrared absorption layer absorbing the near-infrared light,
   wherein the near-infrared absorption layer absorbs a reflected near-infrared light, the reflected near-infrared light first passing through the near-infrared absorption layer and then reflecting from the backside of the near-infrared reflection layer.

2. The laminate film structure according to claim 1, wherein the near-infrared absorption layer is a thermoplastic film including thermoplastic resin and one or more near-infrared light filters.

3. The laminate film structure according to claim 1, wherein each of the one or more near-infrared light filters has a different concentration and a different absorption range between 780 nm and 2000 nm.

4. The laminate film structure according to claim 1, wherein a first near-infrared light absorption layer of the one or more near-infrared light filters has at least one near-infrared light absorption peak within at least one of the following ranges: 780-880 nm, 960-1080 nm, 1180-1320 nm, and 1480-1760 nm, and a percentage of reflection of the near-infrared light from the first near-infrared light absorption layer is less than 9%.

5. The laminate film structure according to claim 1, wherein the near-infrared reflection layer includes: a thermoplastic film with a silver nano-particle coating, or a multilayer infrared reflecting film, or a thermoplastic film with a nano-ceramic coating, or a thermoplastic film with an anti-reflection coating, or a thermoplastic film with a mirror coating.

6. The laminate film structure according to claim 1, wherein near-infrared light transmission of the near-infrared reflection layer is less than 30% and near-infrared light reflection of the near-infrared reflection layer is larger than 31%.

7. The laminate film structure according to claim 1, wherein a near-infrared light reflection peak of the near-infrared reflection layer is between 780 nm and 2000 nm.

8. The laminate film structure according to claim 1, wherein at least one near-infrared light absorption peak of the near-infrared absorption layer substantially matches at least one near-infrared light reflection peak of the near-infrared reflection layer.

9. The laminate film structure according to claim 1, wherein the near-infrared reflection layer is an outer layer of the laminate film structure.

10. The laminate film structure according to claim 1, wherein an ophthalmic lens is disposed between the near-infrared absorption layer and the eye of the wearer.

11. The laminate film structure according to claim 10, wherein the near-infrared absorption layer is integrated with the ophthalmic lens.

12. The laminate film structure according to claim 1, wherein the near-infrared absorption layer absorbs a transmitted near-infrared light, the transmitted near-infrared light first passing through the near-infrared reflection layer.

13. A method of reducing near-infrared light exposure to an eye by a laminate film structure according to claim 1 on an eyewear, comprising:
   absorbing near-infrared light by the near-infrared absorption layer of the laminate film structure, the near-infrared absorption layer being located between the eye and the near-infrared reflection layer; and
   reflecting the near-infrared light by the near-infrared reflection layer of the laminate film structure, the near-infrared reflection layer located on the first near-infrared absorption layer,
   wherein the near-infrared absorption layer absorbs a reflected near-infrared light, the reflected near-infrared light first passing through the near-infrared absorption layer and then reflecting from the backside of the near-infrared reflection layer.

14. An eyewear structure for protecting an eye from near-infrared light, comprising:
   an ophthalmic lens;
   a near-infrared absorption layer disposed on the ophthalmic lens, the near-infrared absorption layer absorbing the near-infrared light; and
   a near-infrared reflection layer disposed on the near-infrared absorption layer, the near-infrared reflection layer reflecting the near-infrared light,
   wherein the ophthalmic lens is disposed between the eye and the near-infrared absorption layer, and
   wherein the near-infrared absorption layer is disposed between the ophthalmic lens and the near-infrared reflection layer.

15. The eyewear structure according to claim 14, wherein a total near-infrared light transmission through the eyewear structure is less than a total visible light transmission through the eyewear structure.

* * * * *